(12) United States Patent
Yang (10) Patent No.: US 10,663,720 B2
(45) Date of Patent: May 26, 2020

(54) OPTICAL LENS

(71) Applicant: HON HAI PRECISION INDUSTRY CO., LTD., New Taipei (TW)

(72) Inventor: Wan-Chien Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 347 days.

(21) Appl. No.: 15/708,139

(22) Filed: Sep. 19, 2017

(65) Prior Publication Data

US 2019/0064511 A1    Feb. 28, 2019

Related U.S. Application Data

(60) Provisional application No. 62/549,445, filed on Aug. 24, 2017.

(51) Int. Cl.
*G02B 27/00* (2006.01)
*G02B 13/00* (2006.01)
*G02B 9/62* (2006.01)

(52) U.S. Cl.
CPC .......... *G02B 27/0025* (2013.01); *G02B 9/62* (2013.01); *G02B 13/0045* (2013.01); *G02B 13/0055* (2013.01)

(58) Field of Classification Search
USPC ....... 359/642, 682, 708, 713, 722, 723, 733, 359/738, 739, 752, 754, 756, 761
See application file for complete search history.

(56) References Cited

U.S. PATENT DOCUMENTS

2018/0239113 A1* 8/2018 Dai .................... G02B 13/0045
2018/0356613 A1* 12/2018 Chen ...................... G02B 13/06

* cited by examiner

*Primary Examiner* — Thomas K Pham
*Assistant Examiner* — Ibrahima Diedhiou
(74) *Attorney, Agent, or Firm* — ScienBiziP, P.C.

(57) ABSTRACT

An optical lens of the present disclosure assembly includes, in order from an object side to an image side, a first lens element, a second lens element, a third lens element, a fourth lens element, a fifth lens element, a sixth lens element, an optical filter and a sensor. The optical lens also has an axis. The first lens element, the fourth lens element and the sixth lens element have negative power. The second lens element, the third lens element and the fifth lens element have positive power.

11 Claims, 9 Drawing Sheets

OPTICAL LENS

CROSS-REFERENCE TO RELATED APPLICATIONS

This application claims the benefit under 35 U.S.C. § 119(e) of U.S. Provisional Application No. 62/549,445, filed on Aug. 24, 2017, entitled "OPTICAL LENS", the disclosure of which is incorporated by reference herein.

FIELD

The subject matter herein generally relates to a lens, especially, relates to an optical lens.

BACKGROUND

In a field of photography, a camera lens is used to acquire visible light to capture the images. In order to get a more compact optical system, the size of image sensor has became smaller. If we keep the same resolution of sensors, the pixel size should be smaller to reduce the length of optical system, so the color aberration has became more and more important to optical design. Nowadays, an optical system with compact size, low optical aberration and good tolerance endurance are needed for the optical lens.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

Figure 1:
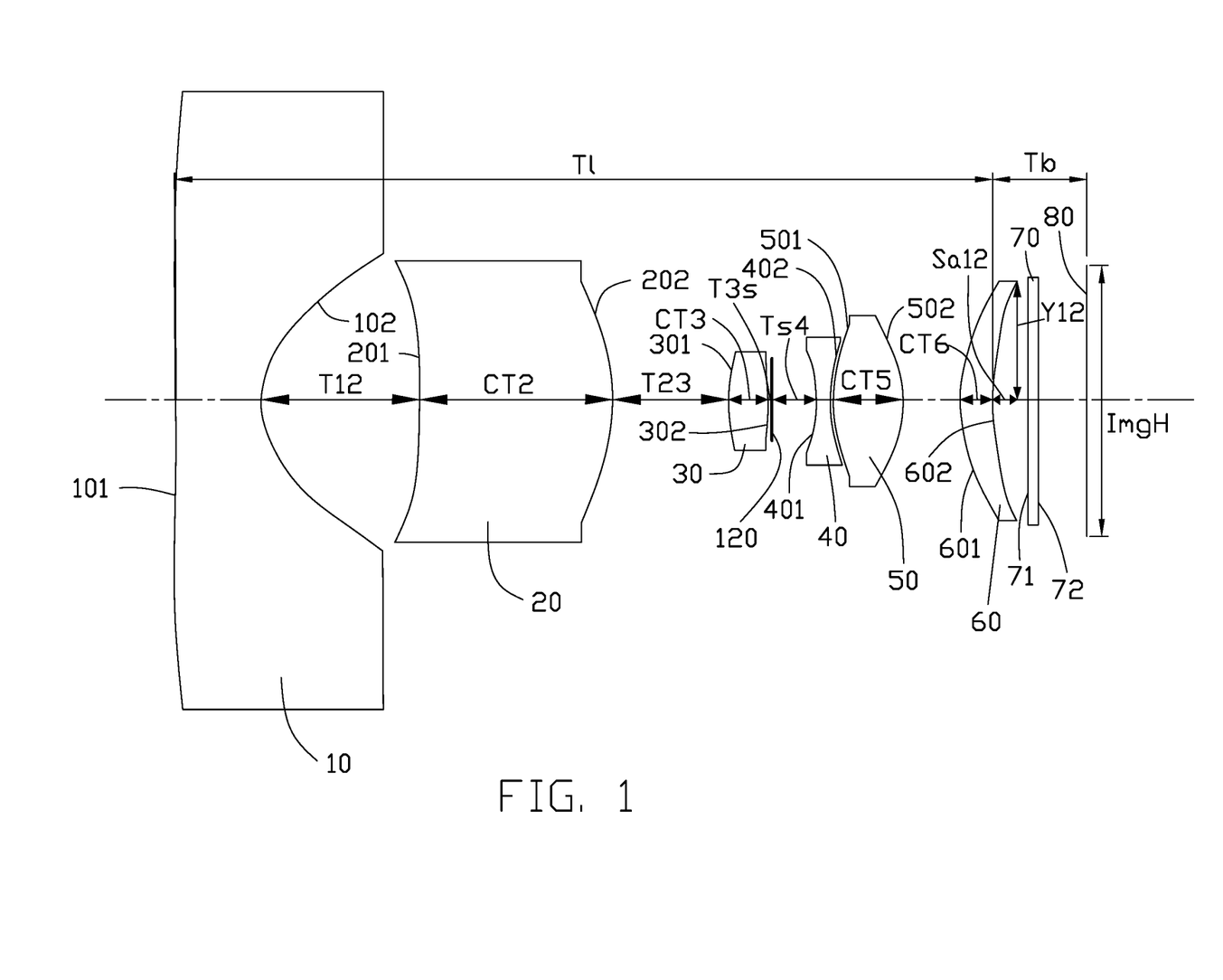
FIG. 1 is a diagrammatic, cross sectional view of an optical lens of the present disclosure.

An optical lens of the present disclosure assembly includes, in order from an object side to an image side, a first lens element 10, a second lens element 20, a third lens element 30, a fourth lens element 40, a fifth lens element 50, a sixth lens element 60, an optical filter 70 and a sensor 80.

The optical lens also has an axis 110. The first lens element 10, a second lens element 20, a third lens element 30, a fourth lens element 40, a fifth lens element 50 and a sixth lens element 60 are symmetrical about the axis 110.

The first lens element 10 has negative power and has a first surface 101 and a second surface 102 opposite to the first surface 101. The first surface 101 is aspheric and convexes towards the object side. The second surface 102 is aspheric and concaves towards the first surface 101 of the first lens element 10.

The second lens element 20 has positive power. The second lens element 20 has a third surface 201 and a fourth surface 202. The third surface 201 is aspheric and concaves towards fourth surface 202. The fourth surface 202 is aspheric and convexes towards the third lens element 30.

The third lens element 30 has positive power. The third lens element 30 has a fifth surface 301 and a sixth surface 302. The fifth surface 301 is aspheric and convexes towards the second lens element 20. An aperture 120 is mounted nearly to the sixth surface 302 of the third lens element 30. The aperture 120 is located on the optical axis 110.

The fourth lens element 40 has negative power. The fourth lens element 40 has a seventh surface 401 and a eighth surface 402. Both the seventh surface 401 and the eighth surface are aspheric. A center of the seventh surface 401 concaves towards the eighth surface 402. The eighth surface 402 concaves towards the seventh surface 401 of the fourth lens element 40.

The fifth lens element 50 has positive power. The fifth lens element 50 has a ninth surface 501 and a tenth surface 502. Both the ninth surface 501 and the tenth surface 502 are aspheric. A center of the ninth surface 501 convexes towards the fourth lens element 40. The tenth surface 502 convexes towards the sixth lens element 60.

The sixth lens element 60 has negative power. The sixth lens element 60 has an eleventh surface 601 and a twelfth surface 602. The eleventh surface 601 is aspheric and convexes towards the fifth lens element 50. The twelfth surface 602 is aspheric and concaves towards the eleventh surface 601 of the sixth lens element 60.

The optical filter 70 has a front surface 71 and a rear surface 72. The front surface 71 and the rear surface are flat plane. The optical filter 70 is used to filter infrared light throughout the sixth lens element 60.

The first surface 101, the second surface 102, the third surface 201, the fourth surface 202, the fifth surface 301, the sixth surface 302, the seventh surface 401, the eighth surface 402, the ninth surface 501, the tenth surface 502, the eleventh surface 601 and the twelfth surface 602 are aspherical surfaces. The even aspherical surface are shaped according to the formula:

$$Z = \frac{ch^2}{1+\sqrt{1-(k+1)c^2h^2}} + \Sigma A_i h^i \quad (a)$$

Wherein Z is a displacement of the z-component from the aspherical surface to a vertex of the aspherical surface, h is a height from the optical axis 110 of the optical lens to the aspherical surface, c is a curvature, k is a conic constant, and Ai are i-th order correction coefficients of the aspherical surfaces.

The optical lens satisfies the formulas:

$$0.14 < Sa12/Y12 < 0.33 \quad (1)$$

$$1.46 < (CT2+CT3)/(CT2-CT3) < 1.55 \quad (2)$$

$$0.23 < (CT5-CT6)/(CT5+CT6) < 0.58 \quad (3)$$

$$0.78 < T12/CT2 < 0.94 \quad (4)$$

$$0.01 < T3s/Ts4 < 0.07 \quad (5)$$

$$0.02 < T45/CT5 < 0.28 \quad (6)$$

$$60 < 2*V6-V4 < 100 \quad (7)$$

Wherein, Sa12 is a length of the twelfth surface 602 projected on the optical axis 110. Y12 is a vertical height from an edge of the twelfth surface 602 to the optical axis 110. CT2 is a length of the optical axis 110 between the third surface 201 and the fourth surface 202 of the second lens element 20. CT3 is a length of the optical axis 110 between the fifth surface 301 and the sixth surface 302 of the third lens element 30. CT5 is a length of the optical axis 110 between the ninth surface 501 and the tenth surface 502 of the fifth lens element 50. CT6 is length of the optical axis 110 between the eleventh surface 601 and the twelfth surface 602 of the sixth lens element 60. T45 is a length of the optical axis between the eighth surface of the fourth lens element and the ninth surface of the fifth lens element. T12 is a length of the optical axis 110 between the second surface 102 of the first lens element 10 and the third surface 201 of the second lens element 20. T3s is a length of the optical axis 110 between the sixth surface 302 of the third lens element 30 and the aperture 120. Ts4 is a length of the optical axis 110 between the aperture 120 and the seventh surface 401 of the fourth lens element 40. V4 and V6 respectively are the abbe number of the fourth lens element 40 and the sixth lens element 60. A color aberration of the optical lens is reduced and an image quality is improved by following the formula (1)-(7).

The optical lens further satisfies the formulas:

$$1.8 < (Fb-Ff)/F^2 < 2.5 \quad (8)$$

$$0.32 < Ff/F23 < 0.57 \quad (9)$$

$$0.18 < F56/Fb < 0.43 \quad (10)$$

$$-1.27 < R1/R2\hat{~}7 < -0.5 \quad (11)$$

$$0.52 < R12/R11\hat{~}2 < 0.73 \quad (12)$$

Wherein, F is the focal length of the optical lens. Ff is a focal length defined between the object side and the aperture 120 and compounded together by the first lens element 10, the second lens element 20 and the third lens element 30. Fb is a focal length defined between the aperture 120 and the sensor 80 and compounded together by the fourth lens element 40, the fifth lens element 50 and the sixth lens element 60. F23 is a focus length compounded by the second lens element 20 and the third lens element 30. F56 is a focus length compounded by the fifth lens element 50 and the sixth lens element 60. R11 and R12 respectively are the radius of curvature of the eleventh surface 601 and the twelfth surface 602 of the sixth lens element 60. R1 and R2 respectively are the radius of the curvature of the first surface and the second surface of the first lens element 10. The formulas (8)-(12) are used to balance the optical power of the optical lens and improve the tolerance sensitivity of the optical lens.

The optical lens further satisfies the formulas:

$$0.14 < Y12/(Tl-Tb) < 0.19 \quad (13)$$

$$1.05 < ImgH/Y12 < 1.56 \quad (14)$$

$$110 < DFov \quad (15)$$

Wherein, ImgH is the maximum imaging height. Tl is a length of the optical axis 110 between the first surface 101 of the first lens element 10 and the twelfth surface 602 of the sixth lens element 60. Tb is a length of the optical axis 110 between the twelfth surface 602 of the sixth lens element 60 and the sensor 80. DFov is a visual angle of the optical lens. The formulas (13)-(15) are used to improve the image quality and also control the radius of lens element and radius of curvature to keep the compact size of the optical lens.

The following embodiment specifically illustrated the optical lens by different parameter.

Referring to tables 1-2 illustrates an optical lens of a first embodiment. In the first embodiment, the optical lens satisfies the parameters of Tables 1-2. The symbols listed below are used in Tables 1-2.

R: a radius of curvature.
L: a distance between surfaces on the axis 110.
N: a refractive index of lens element.
V: an Abbe number.
k: a conic constant.
h: a height from the axis 110 to the surfaces.

TABLE 1

| Surf. Type | | Lens element | R | L (mm) | N | V | h | k |
|---|---|---|---|---|---|---|---|---|
| Object | | | Infinity | Infinity | | | | |
| Even Asphere | first Surface | first lens element | −127.81 | 1.80 | 1.53 | 56.1 | 6.96 | |
| Even Asphere | second Surface | air space | 2.01 | 3.32 | | | 3.31 | −1.53 |
| Even Asphere | third Surface | second lens element | −64.40 | 4.05 | 1.58 | 29.9 | 3.17 | |
| Even Asphere | fourth Surface | air space | −5.21 | 2.46 | | | 2.73 | |

TABLE 1-continued

| Surf. Type | | Lens element | R | L (mm) | N | V | h | k |
|---|---|---|---|---|---|---|---|---|
| Even Asphere | fifth Surface | third lens element | 5.01 | 0.83 | 1.53 | 56.1 | 1.11 | |
| Even Asphere | sixth Surface | air space | −5.75 | −0.04 | | | 0.84 | |
| | | aperture | | 1.04 | | | 0.82 | |
| Even Asphere | seventh Surface | fourth lens element | −4.48 | 0.28 | 1.64 | 23.5 | 1.14 | |
| Even Asphere | eighth Surface | air space | 2.63 | 0.06 | | | 1.44 | −8.73 |
| Even Asphere | ninth Surface | fifth lens element | 3.11 | 1.48 | 1.53 | 56.1 | 1.73 | −7.95 |
| Even Asphere | tenth Surface | air space | −3.18 | 1.20 | | | 1.92 | 0.60 |
| Even Asphere | eleventh Surface | sixth lens element | 3.22 | 0.69 | 1.53 | 56.1 | 2.70 | |
| Even Asphere | twelfth Surface | air space | 6.48 | 0.74 | | | 2.69 | |
| Standard | Front surface | Optical filter | Infinity | 0.21 | 1.52 | 58.6 | 2.75 | |
| Standard | Rear surface | air space | Infinity | 1.03 | | | 2.78 | |
| IMA | | | Infinity | — | | | 3.05 | |

TABLE 2

| | First lens element | | Second lens element | | Third lens element | |
|---|---|---|---|---|---|---|
| Aspheric coefficient | first surface | Second surface | Third surface | Fourth surface | Fifth surface | Sixth surface |
| A2 | 0 | 0 | 0 | 0 | 0 | 0 |
| A4 | 0.0001503 | 0.00403207 | −0.0060647 | 0.0014052 | 0.011235 | 0.012219 |
| A6 | 0 | −0.000149341 | 0.0001605 | 0.0001385 | 0.000789 | −0.00089 |
| A8 | 0 | 1.00156E−05 | 1.866E−06 | −1.039E−05 | 0.000111 | 2.62E−05 |
| A10 | 0 | 0 | −3.356E−08 | 7.952E−07 | 0 | 0 |
| A12 | 0 | 0 | 0 | 0 | 0 | 0 |
| A14 | 0 | 0 | 0 | 0 | 0 | 0 |
| A16 | 0 | 0 | 0 | 0 | 0 | 0 |

| | Fourth lens element | | Fifth lens element | | Sixth lens element | |
|---|---|---|---|---|---|---|
| Aspheric coefficient | Seventh surface | Eighth surface | Ninth surface | Tenth surface | Eleventh surface | Twelfth surface |
| A2 | 0 | 0 | 0 | 0 | 0 | 0 |
| A4 | −0.04353 | −0.00855 | 0.002004418 | −0.00704 | −0.01663 | −0.00039 |
| A6 | 0.010763 | 0.001731 | −7.04124E−05 | 0.004501 | −0.00059 | −0.00405 |
| A8 | −0.00288 | −0.00031 | 0.000116952 | −0.00018 | 0.000421 | 0.000945 |
| A10 | 0 | 0 | −9.9909E−06 | 3.93E−05 | −3.5E−05 | −5.7E−05 |
| A12 | 0 | 0 | 0 | 0 | 0 | 0 |
| A14 | 0 | 0 | 0 | 0 | 0 | 0 |
| A16 | 0 | 0 | 0 | 0 | 0 | 0 |

In the first embodiment, the optical lens satisfies the parameters of Tables 1-2 and the even aspherical surfaces of Tables 1-2 are shaped according to the formula (a).

According to an example of the optical lens of the first embodiment, wherein: EFOV=116, F=2.8, Sa12/Y12=0.18, (CT2+CT3)/(CT2−CT3)=1.52; (CT5−CT6)/(CT5+CT6)=0.36, T12/CT2=0.82, T3 s/Ts4=0.04, T45/CT5=0.04, $2*v6-v4$=88.70, (Fb−Ff)/$F^2$=2.10, Ff/F23=0.48, F56/Fb=0.31, R1/R2$^7$=−0.96, R12/R11$^2$=0.62, Y12/(T1−Tb)=0.16, ImgH/Y12=1.14.

Figure 2:
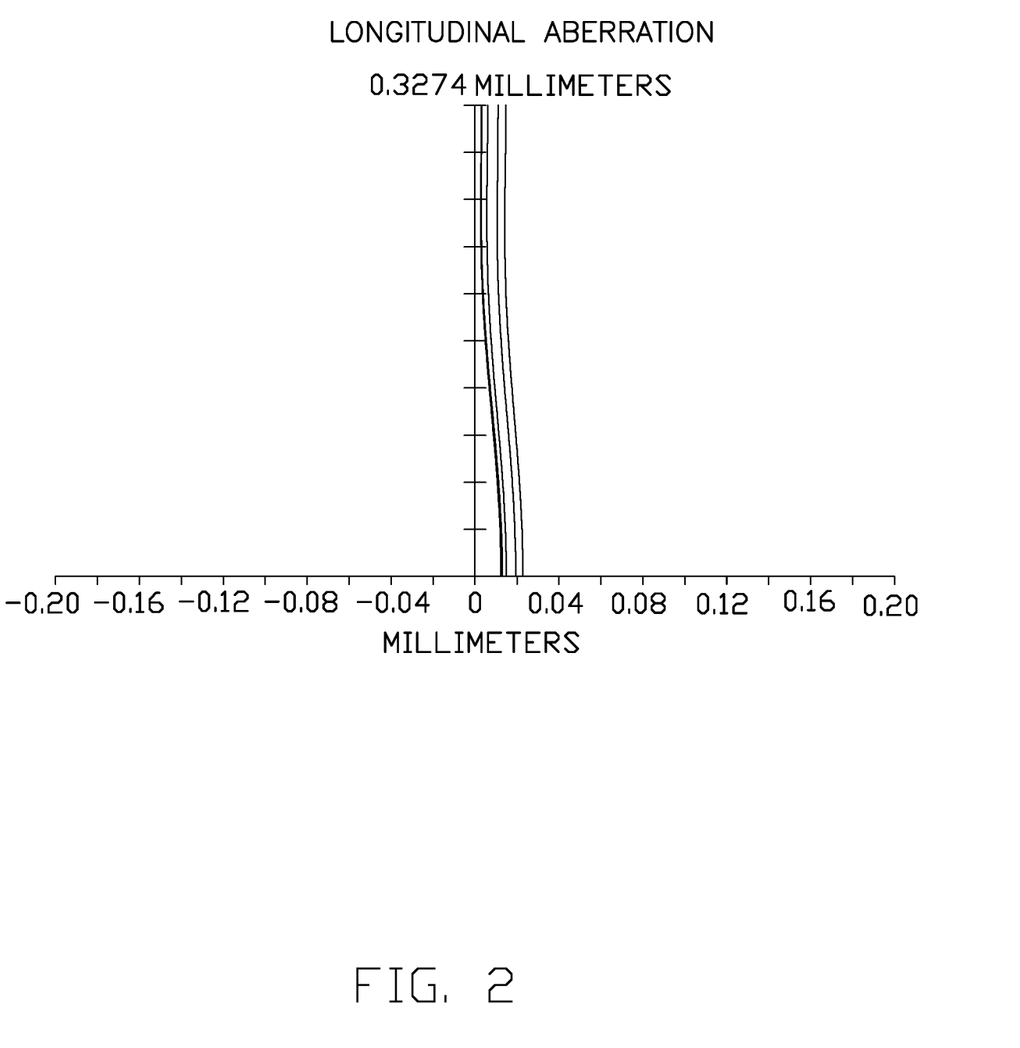
FIG. 2 is a graph showing longitudinal spherical aberration of the optical lens of a first embodiment.
Figure 3:
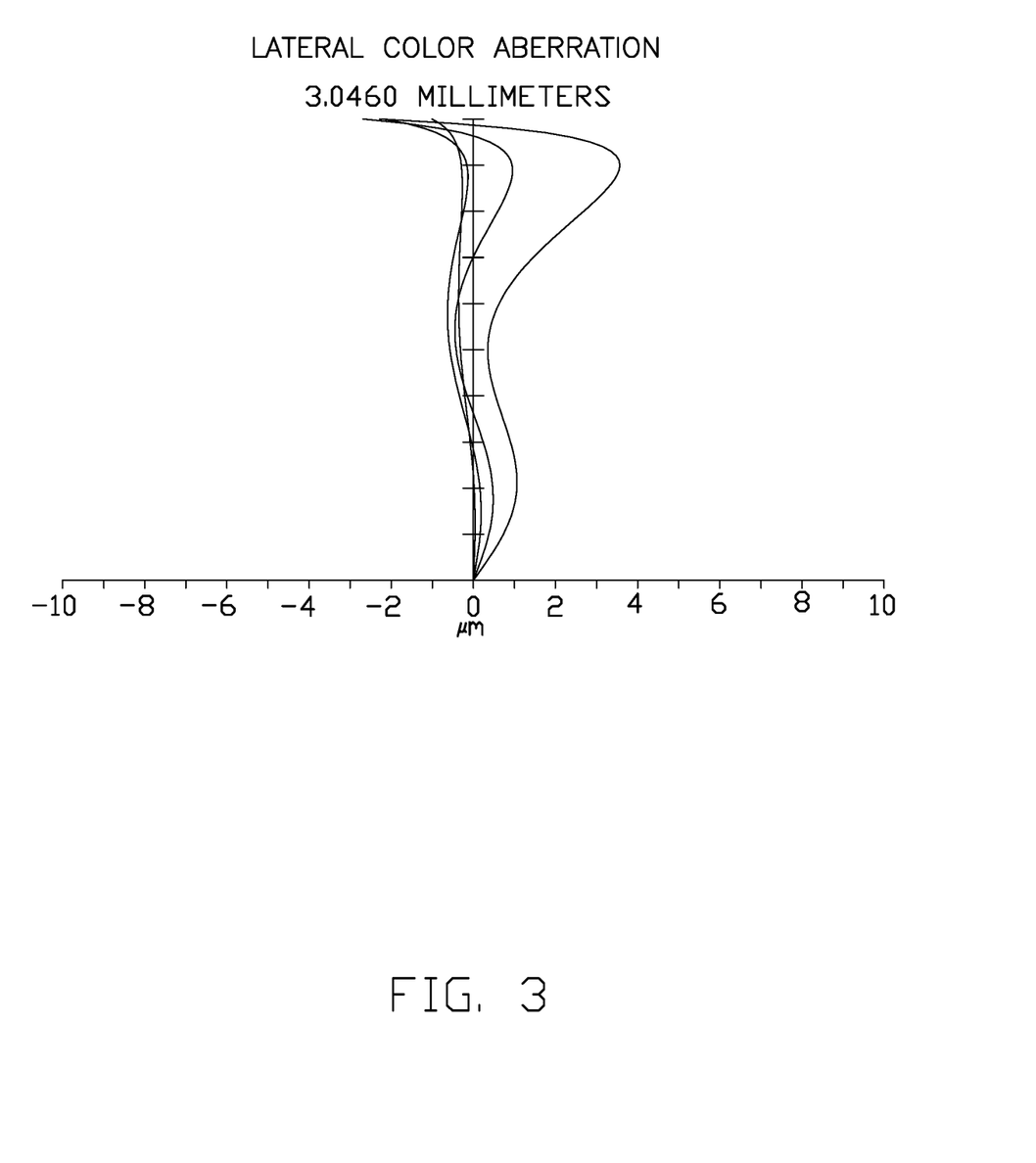
FIG. 3 is a graph showing lateral color aberration of the optical lens of the first embodiment.
Figure 4:
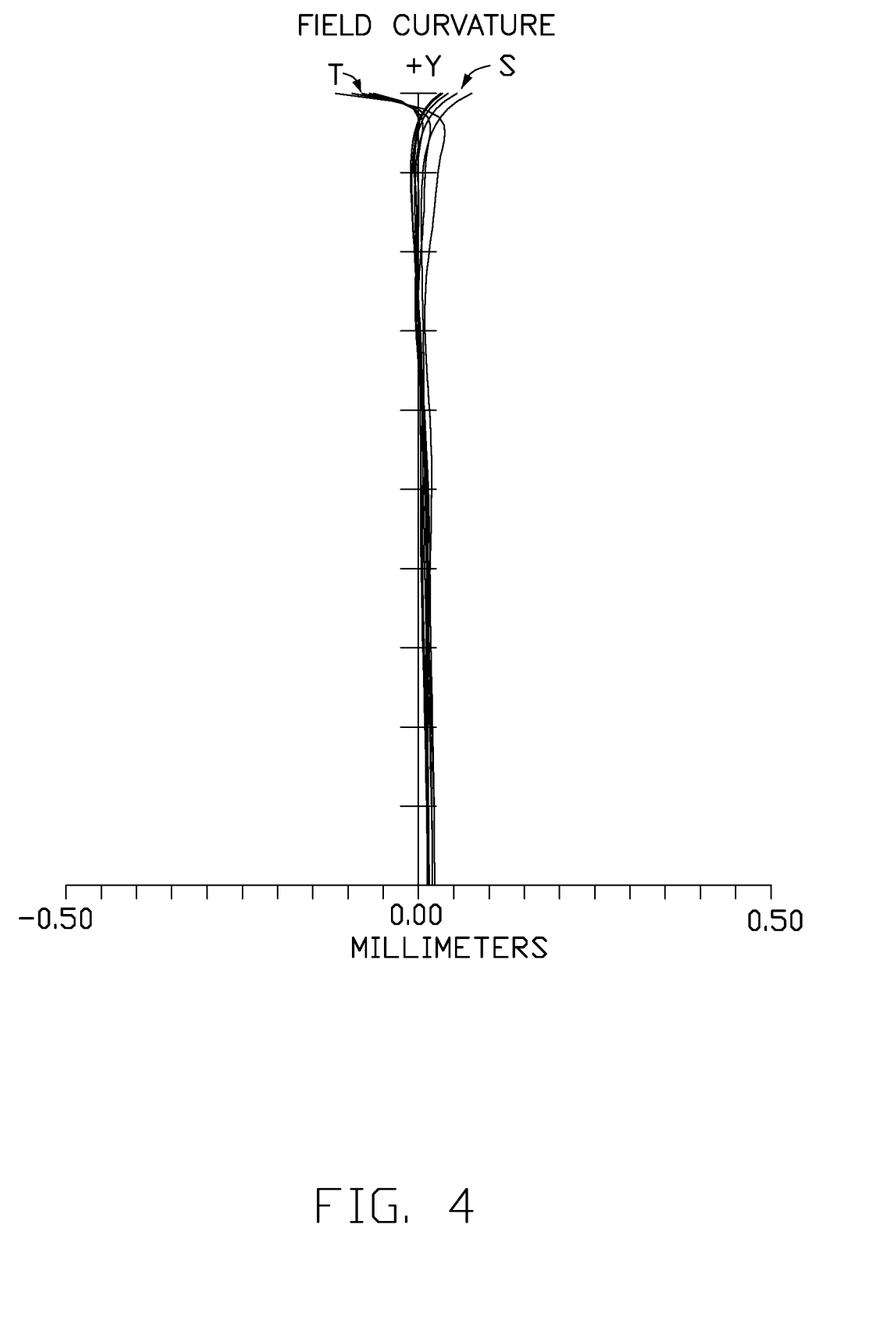
FIG. 4 is a graph showing field curvature of the optical lens of the first embodiment.
Figure 5:
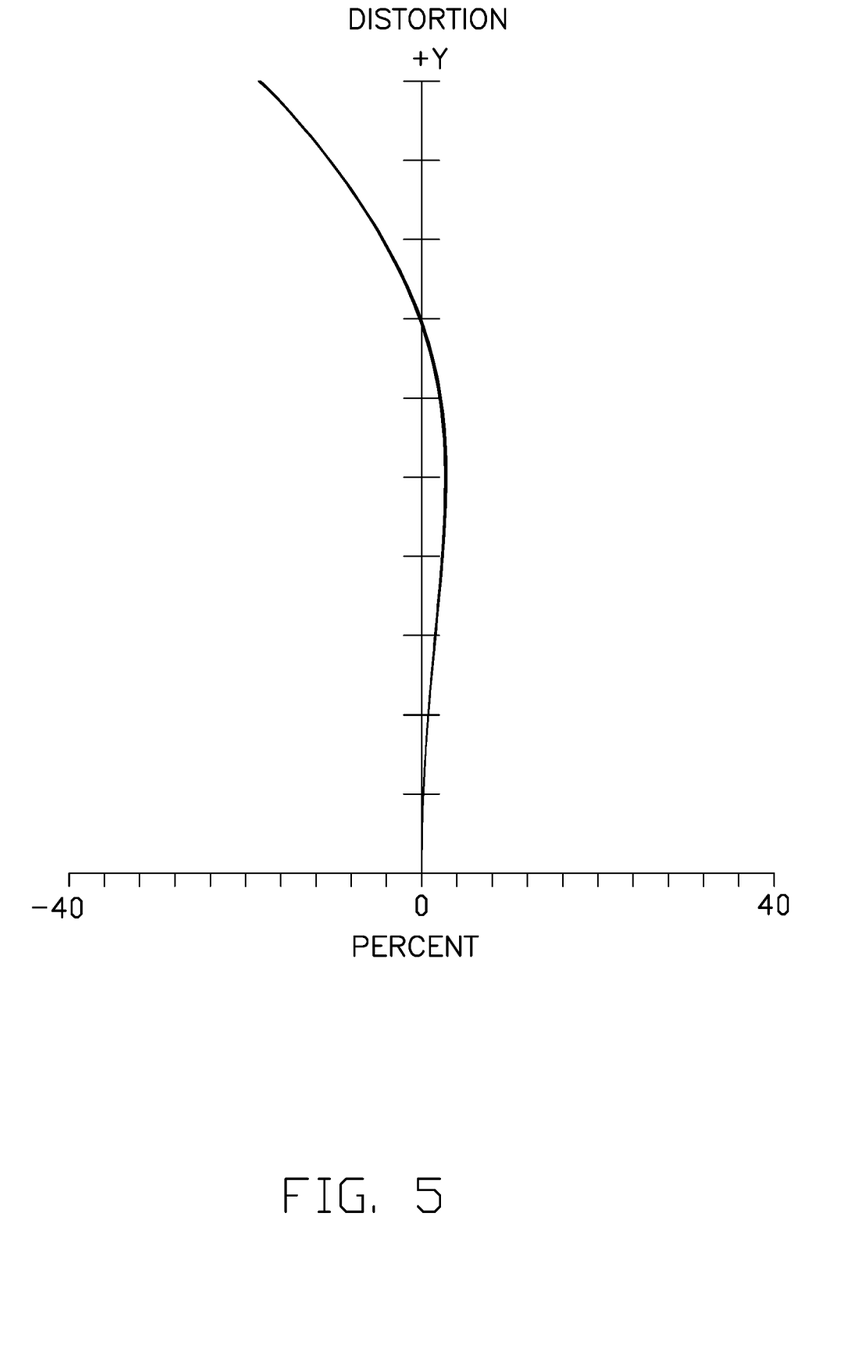
FIG. 5 is a graph showing distortion of the optical lens of the first embodiment.

In the first embodiment, the longitudinal spherical aberration graph, the lateral color aberration graph, the field curvature graph, the distortion graph of the optical lens are respectively shown in FIGS. 2-5. The longitudinal spherical aberration of visible light (with a wavelength between 400-700 nm) shown in FIG. 2 is within a range of 0 mm to 0.04 mm. The lateral color aberration of visible light shown in FIG. 3 is kept in −4 μm to 4 μm. The sagittal field curvature and the tangential field curvature of visible light shown in FIG. 4 are kept in −0.15 mm to 0.15 mm. The distortion of visible light in FIG. 5 falls within a range of 0% to 4%. In the first embodiment, the spherical aberration, field curvature, and distortion are well controlled in the optical lens.

Referring to tables 3-4 illustrates an optical lens of a second embodiment. In the second embodiment, the optical lens satisfies the parameters of Tables 3-4. The symbols listed below are used in Tables 3-4.
R: a radius of curvature.
L: a distance between surfaces on the axis 110.
N: a refractive index of lens element.
V: an Abbe number.
k: a conic constant.
h: a height from the axis 110 to the surfaces.

TABLE 3

| Surf. | Type | | R | L (mm) | N | V | h | K |
|---|---|---|---|---|---|---|---|---|
| Object | | | Infinity | Infinity | | | | |
| Even Asphere | first Surface | first lens element | −88.61 | 1.32 | 1.53 | 56.1 | 6.21 | |
| Even Asphere | second Surface | air space | 1.99 | 3.37 | | | 3.19 | −1.49 |
| Even Asphere | third Surface | second lens element | −71.11 | 3.92 | 1.58 | 29.9 | 2.92 | |
| Even Asphere | fourth Surface | air space | −5.30 | 2.36 | | | 2.51 | |
| Even Asphere | fifth Surface | third lens element | 5.13 | 0.76 | 1.53 | 56.1 | 1.10 | |
| Even Asphere | sixth Surface | air space | −5.52 | −0.02 | | | 0.87 | |
| | | aperture | | 1.00 | | | 0.83 | |
| Even Asphere | seventh Surface | fourth lens element | −4.31 | 0.42 | 1.64 | 23.5 | 1.11 | |
| Even Asphere | eighth Surface | air space | 2.75 | 0.07 | | | 1.43 | −9.33 |
| Even Asphere | ninth Surface | fifth lens element | 3.00 | 1.39 | 1.53 | 56.1 | 1.64 | −7.52 |
| Even Asphere | tenth Surface | air space | −3.22 | 1.21 | | | 1.81 | 0.51 |
| Even Asphere | eleventh Surface | sixth lens element | 3.43 | 0.74 | 1.53 | 56.1 | 2.34 | |
| Even Asphere | twelfth Surfac | air space | 6.20 | 0.72 | | | 2.39 | |
| Standard | Front surface | Optical filter | Infinity | 0.21 | 1.52 | 58.6 | 2.52 | |
| Standard | Rear surface | air space | Infinity | 1.03 | | | 2.58 | |
| IMA | | | Infinity | — | | | 3.05 | |

TABLE 4

| | First lens element | | Second lens element | | Third lens element | |
|---|---|---|---|---|---|---|
| Aspheric coefficient | first surface | Second surface | Third surface | Fourth surface | Fifth surface | Sixth surface |
| A2 | 0 | 0 | 0 | 0 | 0 | 0 |
| A4 | 0.000163 | 0.0039383 | −0.0060406 | 0.0013773 | 0.011802 | 0.0137027 |
| A6 | 0 | −0.0001157 | 0.0001699 | 0.0001402 | 0.0014562 | −0.0030104 |
| A8 | 0 | 1.235E−05 | 1.259E−06 | −7.908E−06 | 0.0003284 | 0.002098 |
| A10 | 0 | 0 | −4.875E−08 | 8.054E−07 | 0 | 0 |
| A12 | 0 | 0 | 0 | 0 | 0 | 0 |
| A14 | 0 | 0 | 0 | 0 | 0 | 0 |
| A16 | 0 | 0 | 0 | 0 | 0 | 0 |

| | Fourth lens element | | Fifth lens element | | Sixth lens element | |
|---|---|---|---|---|---|---|
| Aspheric coefficient | Seventh surface | Eighth surface | Ninth surface | Tenth surface | Eleventh surface | Twelfth surface |
| A2 | 0 | 0 | 0 | 0 | 0 | 0 |
| A4 | −0.042157 | −0.0098127 | 0.0025401 | −0.0062003 | −0.0175802 | 0.0017764 |
| A6 | 0.0120542 | 0.0014152 | −8.187E−05 | 0.0047791 | −0.0005462 | −0.0041214 |
| A8 | −0.0041796 | −0.0004326 | 7.322E−05 | −0.0001837 | 0.0004086 | 0.000939 |
| A10 | 0 | 0 | −1.456E−06 | 2.744E−05 | −3.892E−05 | −5.628E−05 |
| A12 | 0 | 0 | 0 | 0 | 0 | 0 |
| A14 | 0 | 0 | 0 | 0 | 0 | 0 |
| A16 | 0 | 0 | 0 | 0 | 0 | 0 |

In the second embodiment, the optical lens satisfies the parameters of tables 3-4 and the even aspherical surfaces of tables 3-4 are shaped according to the formula (a).

According to an example of the optical lens of the first embodiment, wherein: EFOV=122, F=2.8, Sa12/Y12=0.18, (CT2+CT3)/(CT2−CT3)=1.48, (CT5−CT6)/(CT5+CT6)=0.31, T12/CT2=0.86, T3s/Ts4=0.02, T45/CT5=0.05, $2*v6-v4=88.70$, (Fb−Ff)/F^2=2.35, Ff/F23=0.48, F56/Fb=0.28, R1/R2^7=−0.72, R12/R11^2=0.53, Y12/(T1−Tb)=0.14, ImgH/Y12=1.28.

In the second embodiment, the longitudinal spherical aberration graph, the lateral color aberration graph, the field curvature graph, the distortion graph of the optical lens are respectively shown in FIGS. 6-9.

Figure 6:
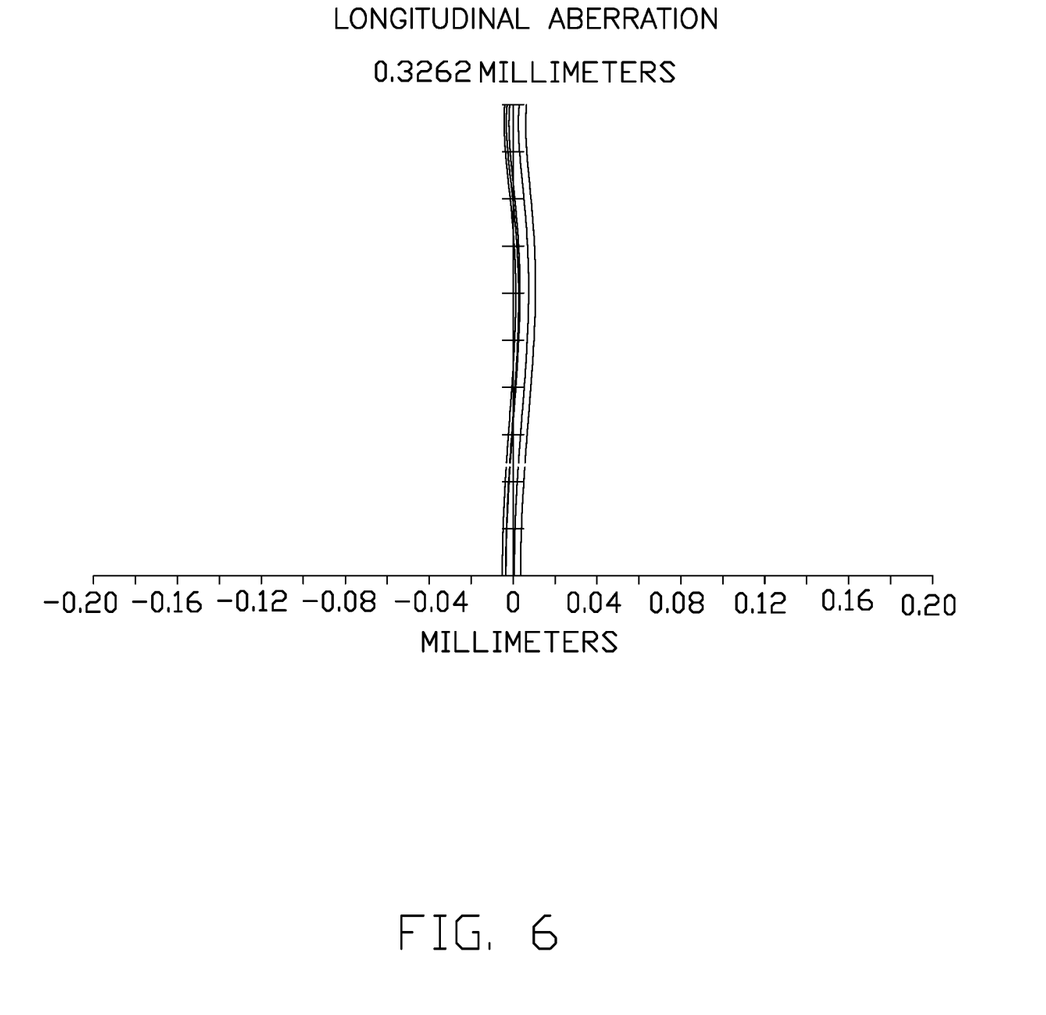
FIG. 6 is a graph showing longitudinal spherical aberration of the optical lens of a second embodiment.
Figure 7:
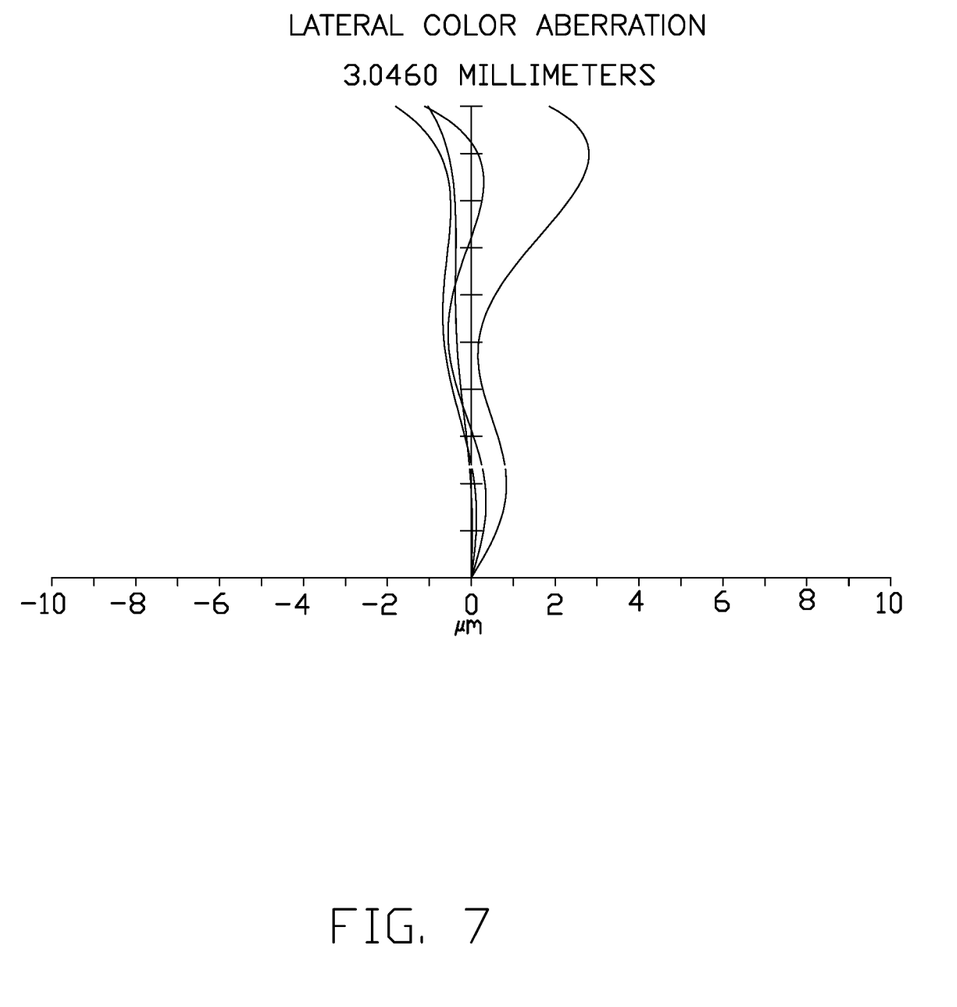
FIG. 7 is a graph showing lateral color aberration of the optical lens of the second embodiment.
Figure 8:
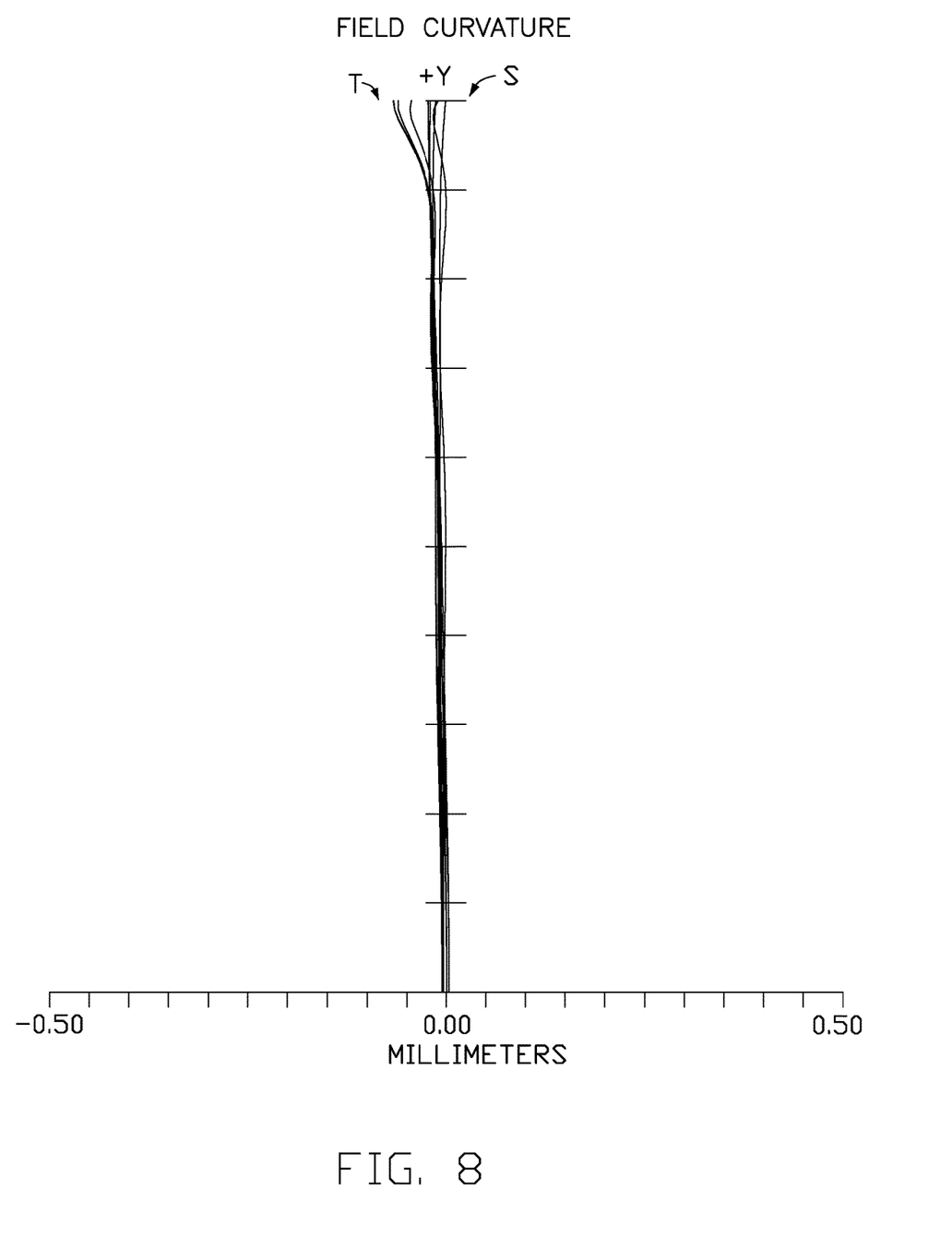
FIG. 8 is a graph showing field curvature of the optical lens of the second embodiment.
Figure 9:
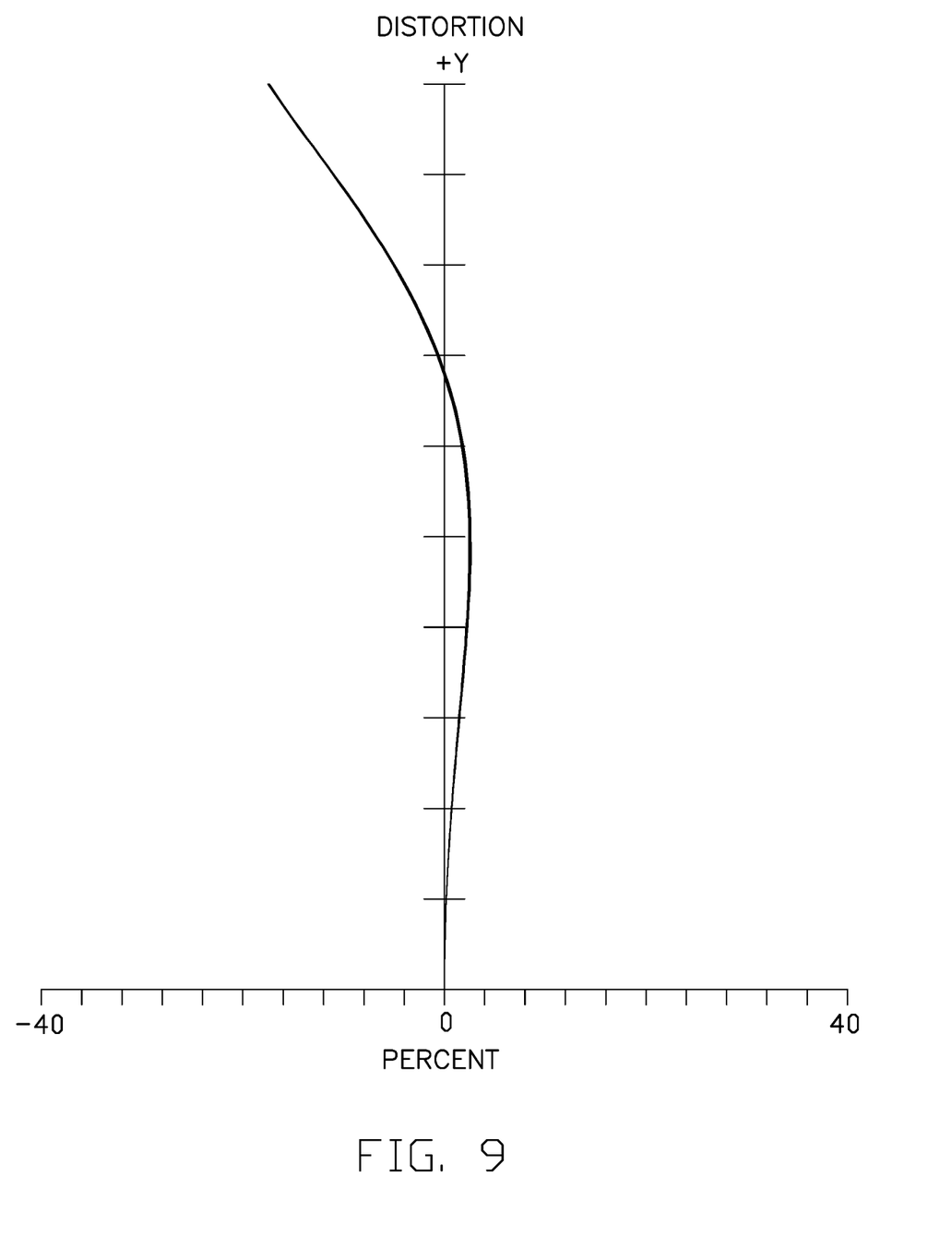
FIG. 9 is a graph showing distortion of the optical lens of the second embodiment.

The longitudinal spherical aberration of visible light (with a wavelength between 400-700 nm) shown in FIG. 6 is within a range of 0.02 mm to 0.02 mm. The lateral color aberration of visible light shown in FIG. 7 is kept in −2 μm to 4 μm. The sagittal field curvature and the tangential field curvature of visible light shown in FIG. 8 are kept in −0.1 mm to 0.05 mm. The distortion of visible light in FIG. 9 falls within a range of −40% to 40%. Obviously in the second embodiment, the spherical aberration, field curvature, and distortion are well controlled in the optical lens.

The embodiments shown and described above are only examples. Many details are often found in the art such as the other features of an optical lens. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An optical lens having an axis, the optical lens comprising:
   a first lens element having a first surface and a second surface opposite to the first surface;
   a second lens element having a third surface and a fourth surface;
   a third lens element having a fifth surface and a sixth surface;
   an aperture;
   a fourth lens element having a seventh surface and a eighth surface;
   a fifth lens element having a ninth surface and tenth surface;
   a sixth lens element having a eleventh surface and twelfth surface; and
   a sensor;
   wherein the optical lens satisfies the following formulas:

$0.14 < Sa12/Y12 < 0.33;$ $1.46 < (CT2+CT3)/(CT2-CT3) < 1.55;$ $0.23 < (CT5-CT6)/(CT5+CT6) < 0.58;$ $0.78 < T12/CT2 < 0.94;$ $0.01 < T3s/Ts4 < 0.07;$ $0.02 < T45/CT5 < 0.28;$ $60 < 2*V6 - V4 < 100;$

Wherein, Sa12 is a length of the twelfth surface projected on the optical axis, Y12 is a vertical height from an edge of the twelfth surface to the optical axis, CT2 is a length of the optical axis between the third surface and the fourth surface of the second lens element, CT3 is a length of the optical axis between the fifth surface and the sixth surface of the third lens element, CT5 is a length of the optical axis between the ninth surface and the tenth surface of the fifth lens element, CT6 is length of the optical axis between the eleventh surface and the twelfth surface of the sixth lens element, T12 is a length of the optical axis between the second surface of the first lens element and the third surface of the second lens element, T45 is a length of the optical axis between the eighth surface of the fourth lens element and the ninth surface of the fifth lens element, T3s is a length of the optical axis between the sixth surface of the third lens element and the aperture, Ts4 is a length of the optical axis between the aperture and the seventh surface of the fourth lens element, V4 and V6 respectively are the abbe number of the fourth lens element and the sixth lens element, the optical lens further satisfies the formulas: $-1.27 < R1/R2^7 < -0.5$, $0.52 < R12/R11^2 < 0.73$, wherein, R1 and R2 respectively are the radius of the curvature of the first surface and the second surface of the first lens element, R11 and R12 respectively are the radius of curvature of the eleventh surface and the twelfth surface of the sixth lens element.

2. The optical lens of claim 1, wherein the optical lens also comprises an optical filter, the optical filter mounts between the sixth lens element and the sensor, the optical filter is spaced from the sixth element and the sensor.

3. The optical lens of claim 2, wherein the optical filter has a front surface and a rear surface, the front surface and the rear surface are flat plane.

4. The optical lens of claim 1, wherein the first lens element and the fourth lens element have negative power, the second lens element, the third lens element, the fifth lens element and the sixth lens element have positive power.

5. The optical lens of claim 1, wherein the first lens element, the second lens element, the third lens element, a fourth lens element, the fifth lens element, a sixth lens element and the sensor are assembled in order from an object side to an image side.

6. The optical lens of claim 5, wherein the first surface is aspheric and convexes towards the object side, the second surface is aspheric and concaves towards the first surface of the first lens element, the third surface is aspheric and concaves towards fourth surface, the fourth surface is aspheric and convexes towards the third lens element, the fifth surface is aspheric and convexes towards the second lens element, a center of the seventh surface concaves towards the eighth surface, the eighth surface concaves towards the seventh surface of the fourth lens element, a center of the ninth surface convexes towards the fourth lens element, the tenth surface convexes towards the sixth lens element, the eleventh surface is aspheric and convexes towards the fifth lens element, the twelfth surface is aspheric and concaves towards the eleventh surface of the sixth lens element.

7. The optical lens of claim 3, wherein the optical lens further satisfies the formulas: $1.8 < (Fb-Ff)/F^2 < 2.5$, wherein F is the focal length of the optical lens, Ff is a focal length defined between the object side and the aperture and compounded together by the first lens element, the second lens element and the third lens element, Fb is a focal length defined between the aperture and the sensor and compounded together by the fourth lens element 40, the fifth lens element and the sixth lens element.

8. The optical lens of claim 7, wherein the optical lens further satisfies the formulas: $0.32 < Ff/F23 < 0.57$, $0.18 < F56/Fb < 0.43$, wherein, F23 is a focus length compounded by the second lens element and the third lens element, F56 is a focus length compounded by the fifth lens element and the sixth lens element.

9. The optical lens of claim 3, wherein the optical lens further satisfies the formulas: $0.14 < Y12/(T1-Tb) < 0.19$, wherein, T1 is a length of the optical axis between the first surface of the first lens element and the twelfth surface of the sixth lens element, Tb is a length of the optical axis between the twelfth surface of the sixth lens element and the sensor.

10. The optical lens of claim 3, wherein the optical lens further satisfies the formulas: $1.05 < ImgH/Y12 < 1.56$, wherein, ImgH is the maximum imaging height.

11. The optical lens of claim 3, wherein the optical lens further satisfies the formulas:
    $110 < DFoV$, wherein, DFov is a visual angle of the optical lens.

* * * * *